United States Patent
Mueller

(10) Patent No.: US 10,035,476 B2
(45) Date of Patent: Jul. 31, 2018

(54) WIRELESS NETWORK HAVING A LOCAL ELECTRICAL POWER SUPPLY IN AIRCRAFT

(71) Applicant: Airbus Operations GmbH, Hamburg (DE)

(72) Inventor: Jan Mueller, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 470 days.

(21) Appl. No.: 14/332,122

(22) Filed: Jul. 15, 2014

(65) Prior Publication Data

US 2014/0327300 A1    Nov. 6, 2014

Related U.S. Application Data

(63) Continuation of application No. PCT/EP2013/050902, filed on Jan. 18, 2013.
(Continued)

(30) Foreign Application Priority Data

Jan. 19, 2012    (DE) .................. 10 2012 000 957

(51) Int. Cl.
*B60R 16/02* (2006.01)
*H04B 5/00* (2006.01)
(Continued)

(52) U.S. Cl.
CPC ...... *B60R 16/0207* (2013.01); *B60R 16/0215* (2013.01); *B60R 16/0231* (2013.01);
(Continued)

(58) Field of Classification Search
CPC ............ B60R 16/0207; B60R 16/0231; B60R 16/0215; H04B 5/0012; H04B 5/0075
(Continued)

(56) References Cited

U.S. PATENT DOCUMENTS

| | | | | |
|---|---|---|---|---|
| 4,928,199 A | * | 5/1990 | Diaz | H01L 45/04 |
| | | | | 252/62.3 S |
| 5,432,486 A | * | 7/1995 | Wong | H01R 12/62 |
| | | | | 333/109 |

(Continued)

FOREIGN PATENT DOCUMENTS

| | | |
|---|---|---|
| EP | 2500271 | 9/2012 |
| FR | 2796216 | 1/2001 |

OTHER PUBLICATIONS

International Search Report, Jun. 7, 2013.
German Search Report and English Translation from DE Application No. 10 2012 000 957.7 (11 pages).

*Primary Examiner* — Jared Fureman
*Assistant Examiner* — Win Htun
(74) *Attorney, Agent, or Firm* — Greer, Burns & Crain, Ltd.

(57) ABSTRACT

A network node for a network provided in a transport means, in particular in an aircraft, the network node being coupleable to a supply line provided for supplying electrical energy to the transport means, in particular the aircraft, in such a way that it can draw a leakage current of the supply line, the network node comprising an energy buffer storage that is chargeable with electrical energy, the energy buffer storage being chargeable by the drawn leakage current with electrical energy.

18 Claims, 4 Drawing Sheets

Related U.S. Application Data

(60) Provisional application No. 61/588,184, filed on Jan. 19, 2012.

(51) Int. Cl.
  *B60R 16/023* (2006.01)
  *H02J 1/14* (2006.01)
  *H02J 5/00* (2016.01)
  *H02J 7/02* (2016.01)
  *H02J 7/34* (2006.01)

(52) U.S. Cl.
  CPC ............... *H02J 1/14* (2013.01); *H02J 5/005* (2013.01); *H02J 7/025* (2013.01); *H02J 7/345* (2013.01); *H04B 5/0012* (2013.01); *H04B 5/0037* (2013.01); *H04B 5/0075* (2013.01)

(58) Field of Classification Search
  USPC .................................................. 307/9.1, 104
  See application file for complete search history.

(56) References Cited

U.S. PATENT DOCUMENTS

| | | | |
|---|---|---|---|
| 6,523,099 B1 | 2/2003 | Namekawa | |
| 7,211,986 B1* | 5/2007 | Flowerdew | H02J 7/025 320/108 |
| 2003/0020332 A1* | 1/2003 | Giannopoulos | H02J 7/025 307/18 |
| 2004/0078662 A1* | 4/2004 | Hamel | B60C 23/0411 714/22 |
| 2005/0140209 A1* | 6/2005 | Fehr | H02J 1/14 307/9.1 |
| 2007/0114422 A1* | 5/2007 | Berkcan | B64D 43/00 250/358.1 |
| 2008/0143186 A1* | 6/2008 | Wisch | H02J 4/00 307/48 |
| 2008/0253327 A1* | 10/2008 | Kohvakka | H04W 16/14 370/330 |
| 2009/0112523 A1* | 4/2009 | Townsend | G08B 21/0446 702/187 |
| 2009/0243895 A1* | 10/2009 | Mitchell | H01Q 1/288 340/971 |
| 2009/0309538 A1* | 12/2009 | Xu | H01M 10/441 320/101 |
| 2010/0007214 A1* | 1/2010 | Howard | B60L 11/182 307/104 |
| 2010/0076714 A1* | 3/2010 | Discenzo | H02N 2/181 702/104 |
| 2010/0159823 A1* | 6/2010 | Smith | H04B 7/155 455/7 |
| 2011/0112775 A1* | 5/2011 | Bramban | G01B 17/04 702/56 |
| 2011/0158806 A1* | 6/2011 | Arms | F03D 1/0658 416/31 |
| 2011/0299470 A1 | 12/2011 | Mueller et al. | |
| 2012/0234971 A1 | 9/2012 | Bugash et al. | |

* cited by examiner

WIRELESS NETWORK HAVING A LOCAL ELECTRICAL POWER SUPPLY IN AIRCRAFT

CROSS-REFERENCES TO RELATED APPLICATIONS

This application is a continuation of International Application PCT/EP2013/050902 filed Jan. 18, 2013, designating the United States and published on Jul. 25, 2013 as WO 2013/107844. This application also claims the benefit of the U.S. Provisional Application No. 61/588,184, filed on Jan. 19, 2012, and of the German patent application No. 10 2012 000 957.7, filed on Jan. 19, 2012, the entire disclosures of which are incorporated herein by way of reference.

BACKGROUND OF THE INVENTION

The present invention relates to a network node for a network provided in a transport device or means, in particular in an aircraft, and to a network for a transport device or means, in particular for an aircraft, having one or more such network nodes.

Energy supply networks (also called on-board networks in the case of transport means) serve to supply electrical energy to electrical consumers (loads) in a transport means such as, for example, an aircraft, a ship, a bus or a train. Frequently, the totality of all electrical components in the transport means is referred to as an on-board network. The electrical components include, inter alia, the cabling, control devices, sensors, indicator elements (such as warning and control lights, displays), actuators (such as electric motors, lights and lighting systems), bus systems, energy storage devices (such as batteries and accumulators) and generators. Frequently, conventional on-board networks are constructed in a star configuration in transport means such as aircraft. This means that the energy generated by generators disposed in the transport means is fed into the on-board network of the transport means via one or more feed-in points. Usually, a plurality of lines (frequently referred to as supply lines or primary supply lines) lead from this feed-in point, or these feed-in points, to individual loads or load groups comprising a multiplicity of loads. Consequently, usually each load or each load group is supplied with electrical energy by its own supply line, which goes out from the feed-in point.

This means either that an individual device (load) is supplied by an associated supply line or that a device group (load group) comprising a plurality of individual devices is supplied by a supply line. The lines leading from the feed-in point to the individual devices or device groups are centrally fuse-protected, by suitable fuses, at the feed-in point. As a result, faults or failures such as, for example, overvoltages or malfunctions in the individual devices or cables can be fuse-protected in a reliable manner. Over-reach to other individual devices, device groups and the functions executed therein is prevented.

The loads can call for the required energy at any time through the existing wired connection to the feed-in point. Some loads, such as actuators, convert electronic signals into mechanical movement or other physical quantities over long periods of time, frequently even continuously. Actuators are to a certain extent almost permanently in use and, accordingly, also require continuous energy replenishment. Frequently, on the other hand, other loads are in use only for a very short period of time, for example while they execute a short control operation, and subsequently return to a sleep mode. When in the sleep mode, the load requires only very little energy. An example of such loads is that of sensor nodes, which are frequently organized into sensor networks in transport means, in order to poll their environment by means of sensors and to forward the information received. These sensor nodes are usually only in use for short periods of time, namely, whenever they perform a corresponding measuring operation and forward the measurement information.

In order to make on-board networks independent of cables, there was a concept to provide a sensor system that supplies itself with current. For each individual sensor provided in the sensor system, its own generator, e.g., a thermoelectric generator (also called a thermoelement) or a vibration energy collector generates current. These systems are frequently combined under the general term "energy harvesting". These systems obtain energy at given times from sources such as ambient temperature, vibrations or air flows. As an alternative to such an energy collector, a battery allows electrical energy to be provided for a certain period of time.

SUMMARY OF THE INVENTION

It is an object of the present invention to provide a network node, and a network having one or more such network nodes, that can be supplied with electrical energy in an efficient and reliable manner.

The network node according to the invention for a network provided in a transport means, in particular in an aircraft, is coupleable to a supply line provided for supplying electrical energy to the transport means, in particular the aircraft, in such a way that it can draw a leakage current of the supply line. The network node comprises an energy buffer storage that is chargeable with electrical energy, wherein the energy buffer storage is chargeable by the drawn leakage current with electrical energy.

The term leakage current is to be understood to mean a current whose current intensity (in amperes) is less by a multiple than that of the current carried in the supply line. For example, the current conducted via the supply line can have a current intensity that is a hundred times or a thousand times or ten thousand times higher than the leakage current. The leakage current that is drawn is thus less by a multiple than the current conducted via the supply line. To that extent, it can also be said that the network node is coupleable to the supply line in such a way that it can draw a fraction, e.g., a hundredth or a thousandth, of the current conducted via the supply line. Accordingly, the term leakage current is to be understood to mean a very small current, as compared with the current in the coupled supply line. Purely by way of example, it may be mentioned here that the current of the supply line has a current intensity of, for example, 1 A, and the drawn leakage current has a current intensity of, for example, 1 mA.

This means that the term leakage current is not necessarily to be understood to mean an unwanted current, as often denoted by the term leakage current, flowing via a path not intended for conducting current. The concept of leakage current signifies merely that the drawn current is a fraction of the current flowing through the supply line.

The network node can be any electronic or electrical load provided in or on a transport means, in particular in or on an aircraft. In particular, it can be a device that requires a small amount of current only for short periods of time or for short intervals, for example in order to perform a measurement or control operation. For example, the network node is a sensor node, which may be disposed in a sensor network. The sensor node may have one or more sensors, in order to poll or collect information about its environment. The sensors may be, for example, any possible active sensor that can convert mechanical, chemical, light or heat energy into electrical energy. The sensors may be, for example, temperature sensors for measuring the ambient temperature, or pressure sensors for measuring the ambient pressure. Further, the sensors may be proximity sensors, which react to approach and which can be used, for example, to determine which position a mechanical part has (position recognition), or they may be position sensors for determining, for example, an angle of a mechanical part (e.g., for determining whether a door is open or closed). They may also be sensors that can be combined under the general term structural health monitoring (SHM), i.e., sensors used to continuously obtain indications about the functional capability of components. In this way, damage, such as cracks or deformations, can be identified in good time, in order for counter measures to be initiated. Examples of such sensors are strain gauges, acoustic sensors and ultrasonic sensors. A plurality of sensor nodes, each comprising one or more of the sensors mentioned above by way of example, may be disposed in the transport means, e.g., on board the aircraft, or on the transport means, e.g., on an aircraft wall.

The network node, in particular the sensor node, may be coupleable to at least one associated supply line for the purpose of drawing the leakage current. In particular, the network node may be coupleable to precisely one associated supply line for the purpose of drawing the leakage current. It is also possible, however, for the network node to be such that it is coupleable to more than one supply line, e.g., to two, three, four or more supply lines, and to draw leakage current, i.e., a fraction of the current conducted via the respective supply line, from each of the supply lines.

As a result of being coupled to the supply line, the network node can draw or tap leakage current (i.e., a very small current) and can consequently charge the energy buffer storage with electrical energy. If the network node temporarily requires electrical energy, e.g., for a control task that is to be executed, the energy buffer storage may deliver the required energy to the respective components of the network node. For example, if the network node is realized as a sensor node, the sensor node can draw as much electrical energy from the energy buffer storage as it requires to execute a measurement.

By means of the network node having the energy buffer storage, the current that is required can be reduced significantly. The energy buffer storage may be charged with leakage currents (i.e., small currents), for example, over long periods of time, e.g., also at least almost continuously or for continuous periods, and the network node may correspondingly consume current in short intervals of time, e.g., also at least almost in a time-discrete manner, in that the energy buffer storage is temporarily discharged.

The network node may be coupled to the supply line in various ways, in order to draw leakage current. According to a first possible realization, the network node may be connected, e.g., directly, to the current-carrying conductor provided in the supply line for conducting the supply current. In accordance with this first realization, a faction of the current flowing via the current-carrying conductor may be drawn or tapped via the coupling. The drawn current may then be stored temporarily, in the form of electrical energy, in the energy buffer storage of the network node. According to a second possible realization, the network node may be connected, e.g., directly, to an insulation (insulator) of the supply line surrounding, for example, the current-carrying conductor. In accordance with this second realization, a leakage current or creepage current that is present in the insulation and that is smaller by a multiple than the current conducted in the current-carrying conductor may be drawn via the coupling. The drawn current may then be stored temporarily, in the form of electrical energy, in the energy buffer storage of the network node.

Leakage currents can occur in the supply line for a variety of reasons. For example, leakage currents can occur in the supply line if the insulator surrounding the supply line (inter alia, for the purpose of insulating from other supply lines) is not ideal, i.e., it has an at least slight electrical conductivity and thus carries an at least small current. It is also conceivable that the surface of an insulator surrounding the supply line carries a creepage current, for example if there is soiling and/or moisture present on the surface. Leakage currents can also occur on the supply line for other reasons, not listed exhaustively here, and can be tapped or drawn by the network node via the previously described coupling to the supply line, according to the second realization.

The network node, in particular the sensor node, may further comprise a protective circuit. The protective circuit is configured, in particular, to prevent electrical faults, caused by the network node, from being forwarded in the direction of the supply line and/or to prevent the input of electrical faults, coming from the direction of the supply line, into the network node. In particular, the protective circuit may be configured to prevent electrical faults, caused by the network node, from being forwarded to other electronic devices or loads connected to the supply line, such as other network nodes or electronic devices connected to the supply line, and/or to prevent the input of electrical faults, caused by other electronic devices connected to the supply line, into the network node. Electrical faults coming from the direction of the supply line may be, for example, spurious electrical signals caused by malfunctions (incorrect behavior) or faults or failures of electronic devices connected to the supply line. The protective circuit can ensure that these spurious signals do not enter the network node via the supply line and the coupling of the network node to the supply line. The electrical faults coming from the direction of the supply line may also be caused, for example, by overvoltages between two or more supply lines. These faults, likewise, can be kept away from the network node by the protective circuit. The electrical faults caused by the network node may be, for example, spurious electrical signals caused by malfunctions (incorrect behavior) of the network node or components of the network node. These faults, likewise, can be kept away from other electronic devices, connected to the supply line, by the protective circuit. As an alternative or in addition to the examples mentioned above, the protective circuit may be configured to keep away overvoltages (from the network node and/or from the other electronic devices), such as overvoltages caused by lightning strikes or radar irradiation.

The protective circuit may be configured to reduce any overvoltages or voltage peaks that occur. Various designs are conceivable for the protective circuit. According to one design, the protective circuit may comprise a diode, in particular a Zener diode (Z-diode). According to another design, the protective circuit may comprise an RC element and/or an overcurrent circuit breaker. Also conceivable are other designs of the protective circuit, in which the protective circuit comprises, for example, a varistor, a resistor or a circuit comprising a diode and Zener diode. Further, it is conceivable for the protective circuit to switch off electronically.

The energy buffer storage and/or the protective circuit may be integrated into the network node. The energy buffer storage and/or the protective circuit may be miniaturized, for example, in order to be integrated into a miniaturized network node. The energy buffer storage may be, for example, an accumulator and/or a capacitor, in particular a super-capacitor, or the energy buffer storage may comprise an accumulator and/or a capacitor, in particular a super-capacitor. The super-capacitor may be configured, for example, as a double-layer capacitor, as an ultra-capacitor or as a hybrid capacitor.

Irrespective of the precise design of the energy buffer storage or the design of the coupling of the network node, in particular the sensor node, to the supply line, the network node may be configured to draw the leakage current from the supply line continuously over time and to charge the energy buffer storage with the drawn leakage current, e.g., also continuously over time. Consequently, the energy buffer storage may be charged continuously with a very small current. Because of the coupling to the supply line, the network node, by drawing leakage currents, may charge the energy buffer storage with such a very small current.

According to a possible configuration, the network node may be coupleable contactlessly to the associated supply line. This contactless coupling may be, in particular, an inductive or capacitive coupling of the network node to the supply line. The contactless, e.g., capacitive or inductive, coupling to the supply line enables the network node to draw the leakage current. Alternatively, however, it is also conceivable for the network node to be coupled to the supply line via contacts or a galvanic coupling, in order to draw the leakage current.

The inductive coupling may be effected by the coupling of two or more inductors or coils, one of which is connected to the supply line and another of which is connected to the network node. The coils used may have one or more windings, for example only a single-digit number of windings such as, for example, one, two, three, four, five, six or more than six windings. It is possible for the two coils to have the same number or, also, a differing number of windings. The number of windings may be selected such that it is sufficient to draw a leakage current in the range of a few $\mu A$, such as a two-digit $\mu A$ value, for example a leakage current from 10 $\mu A$ to 20 $\mu A$, or a leakage current of a few mA such as, for example, 1 mA, 2 mA or more than 2 mA. The capacitive coupling may be effected by means of a capacitor, one capacitor plate of which is connected to the supply line and the other capacitor plate of which is connected to the network node. In this case, also, the selected capacitor surface and/or the selected capacitor plate size and/or the selected capacitor plate spacing may be suited to drawing a leakage current in the range of a few $\mu A$, such as a two-digit $\mu A$ value, for example a leakage current of 10 $\mu A$ to 20 $\mu A$, or a leakage current of a few mA such as, for example, 1 mA, 2 mA or more than 2 mA.

As explained previously, the network node may draw the leakage current from the supply line, for example continuously over time, and charge the energy buffer storage with the drawn leakage current. The delivery of energy from the energy buffer storage may be effected in various ways. In particular, the energy buffer storage is configured to deliver electrical energy, stored in the energy buffer storage for the purpose of supplying the network node, when the network node requires electrical energy. Accordingly, the delivery of electrical energy may be effected, for example, only for short periods of time, such as, for example, in a time-discrete manner. If the network node is configured, for example, as a sensor node, then for most of the time the sensor node is in a sleep mode (i.e., the sensor node is inactive), in which it has to draw only a small amount of energy out of the energy buffer storage. For the purpose of performing a measurement, the sensor node wakes up (i.e., the sensor node is active) and performs the measurement for a short timespan. For this short timespan, the network node draws electrical energy out of the energy buffer storage, in order to perform the measurement. Since small currents are consumed for short periods of time and the energy buffer storage is charged with low currents, the energy buffer storage may be miniaturized and integrated into the sensor node. It is conceivable, for example, for the network node, in particular the sensor node, to consume current in the range of a few $\mu A$, for example from 10 $\mu A$ to 20 $\mu A$. For the purpose of performing its task, e.g., its control or measurement task, the network node may consume a higher current, in the range of a few mA, e.g., from 10 mA to 30 mA.

According to a first possible realization, the network node may further have a transformation component for transforming the drawn leakage current into a quantity, e.g., a current quantity, suitable for supplying the network node. For example, the transformation component may be configured to transform a higher voltage, available on the supply line, into a lower voltage quantity suitable for use in the network node, in particular in the sensor node. It is conceivable for a voltage of 28 volts or 110 volts of a.c. voltage to be present on the supply line, which voltage is too high for operation of the network node. The high voltage could cause the network node to be damaged, for example. The transformation component can convert the voltage into a more suitable voltage, e.g., in the single-digit volt range, for example 3 volts.

According to a second possible realization, which may be realized independently or in combination with the first realization, the network node may further comprise a communication module for wireless and/or wired communication with other network nodes, in particular sensor nodes, provided in the network of the transport means. Via the communication module, the network node, in particular the sensor node, may transmit, for example, its measurement results to other network nodes, such as other sensor nodes or central servers or control units, in which the results are then evaluated or used further in another way. Via the communication module the network node may also obtain status polls, or obtain instructions that, for example, a particular control operation or measurement is to be executed. The communication module, likewise, may be supplied by the electrical energy stored in the energy buffer storage.

The network according to the invention for a transport means, in particular for an aircraft, comprises one or more network nodes, such as those described, or that have been described, herein, that can be coupled to one or more supply lines for supplying electrical energy to the transport means, in particular the aircraft. Each of the one or more network nodes is coupleable, or is coupled, to at least one associated supply line of the one or more supply lines, for the purpose of drawing leakage current. In particular, each of the one or more network nodes is coupleable, or is coupled, to precisely one associated supply line, for the purpose of drawing leakage current.

According to a possible realization, the network may be realized so as to have one or more sensor nodes, such as those described, or that have been described, herein.

According to a possible configuration, the network, in particular the sensor network, comprises one or more coupling units, each of the one or more network nodes being such that they can be coupled, or are coupled, to the associated supply line by means of one of the one or more coupling units. It is also possible for a subset of network nodes to be such that it can be coupled, or is coupled, respectively, to a plurality of associated supply lines via a plurality of coupling units.

The one or more coupling units may be realized, for example, for contactless, in particular inductive or capacitive, coupling of the network node to the associated supply line. For this purpose, the one or more coupling units may comprise one or more inductors or one or more capacitors for coupling to the supply line and for drawing the leakage current. Alternatively, it is also possible for the one or more coupling units to comprise contacts, via which the network node can be coupled to the associated supply line.

The network may comprise a multiplicity of network nodes and a corresponding multiplicity of coupling units. It is possible for a subset of the multiplicity of network nodes to be such that it is coupleable, or is coupled, to more than one supply line. Another subset of the multiplicity of network nodes may be such that it is coupleable, or is coupled, correspondingly, only to one associated supply line.

It is conceivable that at least a subset of the multiplicity of coupling units is configured for contactless, in particular inductive or capacitive, coupling of the network nodes to the associated supply lines. In the case of a multiplicity of coupling units, the various possible coupling types may be combined with each other, i.e., a subset of the coupling units may be configured for inductive coupling, another subset of the coupling units may be configured for capacitive coupling, and a further subset of coupling units may be configured for coupling via contacts.

According to a possible variant, at least a subset, for example even all, of the network nodes, in particular the sensor nodes, may comprise a communication module for wireless and/or wired communication with other network nodes provided in the network, in particular the sensor network. Further, the network may comprise a central fuse protection, in particular a fuse, which is configured for common fuse protection of the one or more supply lines. The central fuse protection may be provided, for example, at a central feed-in point of the network, such that the fuse protection protects by fuse all supply lines connected to the feed-in point.

BRIEF DESCRIPTION OF THE DRAWINGS

Preferred embodiments of the present invention are explained in the following with reference to the appended schematic figures, wherein.

DETAILED DESCRIPTION OF THE PREFERRED EMBODIMENTS

It is assumed in the following, by way of example, that the networks shown in the figures are networks of an aircraft. Likewise, it is assumed in the following, by way of example, that the devices and sensors shown in the figures are those of an aircraft. However, the components described in the following are not limited to use in aircraft, but can also be arranged in other transport devices or means, such as trains, buses or ships.

Figure 1:
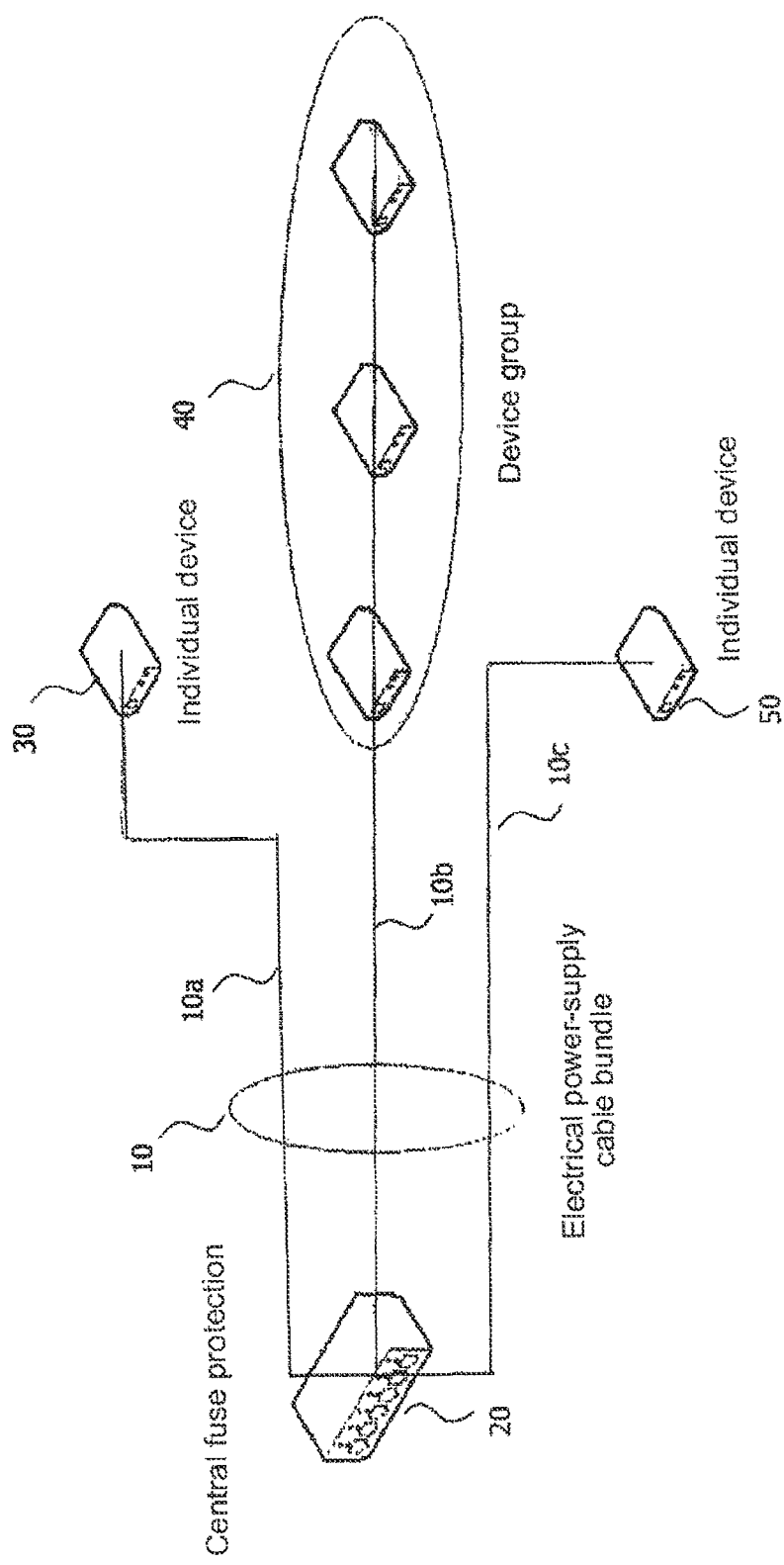
FIG. 1 shows a schematic representation of a conventional structure for supplying electrical energy to a network.

FIG. 1 shows the basic architecture of a conventional network provided in an aircraft. In particular, FIG. 1 shows a schematic representation of a conventional architecture of an on-board network, which effects fuse protection of cables (supply lines) and devices against malfunctions.

Energy generated by means of one or more generators is fed into the on-board network via a central feed-in point. A plurality of supply lines (primary supply cables) 10a, 10b, 10c in a cable bundle 10 lead away from the feed-in point, in order to distribute the fed-in energy to various devices, and to supply these devices with current. Three such lines 10a, 10b, 10c are shown by way of example in FIG. 1, but any possible multiplicity of supply lines can lead away from the feed-in point. The supply lines 10a, 10b, 10c are fuse-protected at the central feed-in point by means of a central fuse protection 20 (a central fuse). For example, two of the three supply lines, namely the supply line 10a, 10c, lead respectively into an individual device 30, 50, in order to supply these individual devices 30, 50 with current. Another supply line, 10b, leads from the feed-in point to a device group 40, in which a multiplicity of individual devices are disposed (by way of example, three individual devices in FIG. 1), which are supplied jointly by the one supply line 10b.

The central fuse protection 20 serves to prevent faults or malfunctions such as, for example, overvoltages between the lines 10a, 10b, 10c or malfunctions in the devices, from reaching over to other parts of the on-board network, such as other individual devices or device groups. If a malfunction occurs in the individual device 30, for example, a resultant malfunction of the individual device 50 or of the device group 40 is prevented by the central fuse protection 20.

Figure 2:
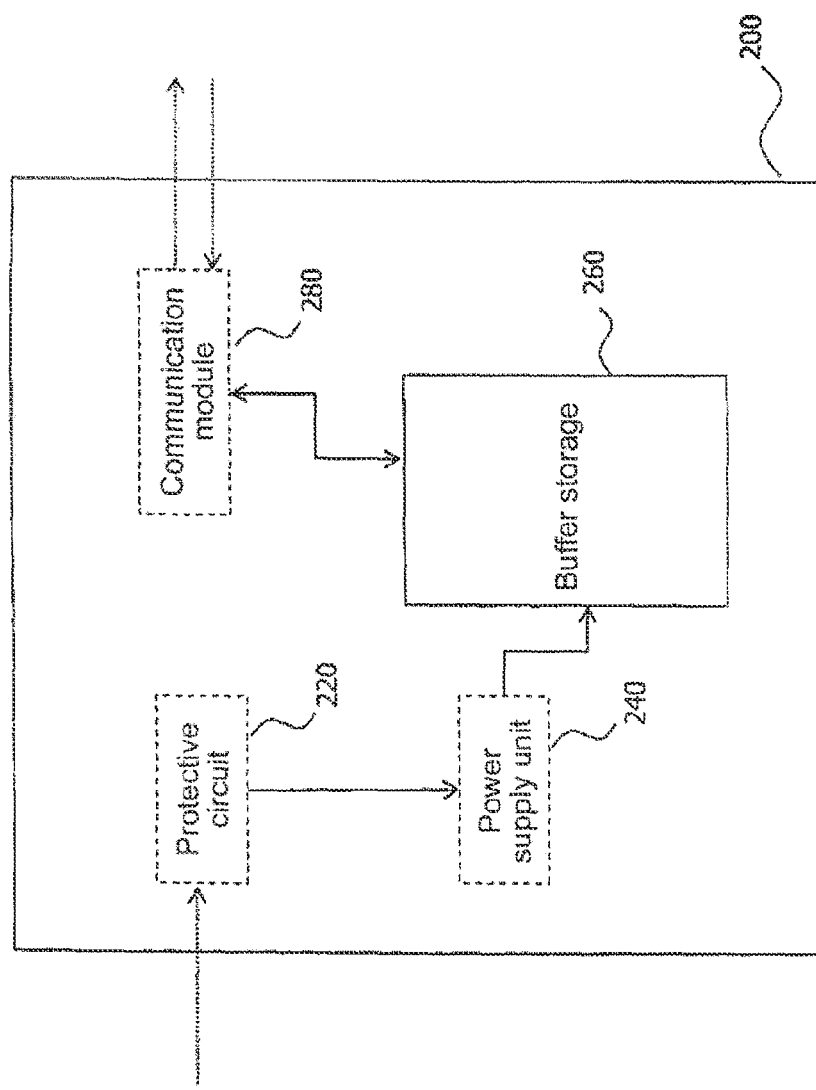
FIG. 2 shows a schematic representation of a network node according to an embodiment of the present invention.

FIG. 2 shows a schematic representation of a network node according to an embodiment of the present invention. The network node may be, for example, a sensor node comprising one or more sensors for measuring various parameters such as, for example, temperature, pressure, etc. However, the invention is not limited to sensor nodes.

The network node 200 comprises a buffer storage 260, which can be charged with electrical energy and can supply electrical energy to the network node 200 (more precisely, components of the network node 200 that require electrical energy) by delivering the stored energy. In addition to the buffer storage 260, the network node 200 can optionally comprise a protective circuit 220, a power supply unit 240 and/or a communication module 280, independently of each other or in combination with each other. As indicated by the broken lines, the protective circuit 220, the power supply unit 240 and the communication module 280 are merely optional, and may also be omitted. If the protective circuit 220 is omitted, the arrow that points into the protective circuit 220 in FIG. 2, symbolizing the drawing of leakage current from a supply line, can lead directly into the buffer storage 260, such that the buffer storage 260 can be charged directly with the drawn leakage current. If, for example, the protective circuit 220 is present in the network node 200, but the power supply unit 240 is not present, then the protective circuit 220 can be connected directly to the buffer storage 260.

Figure 3:
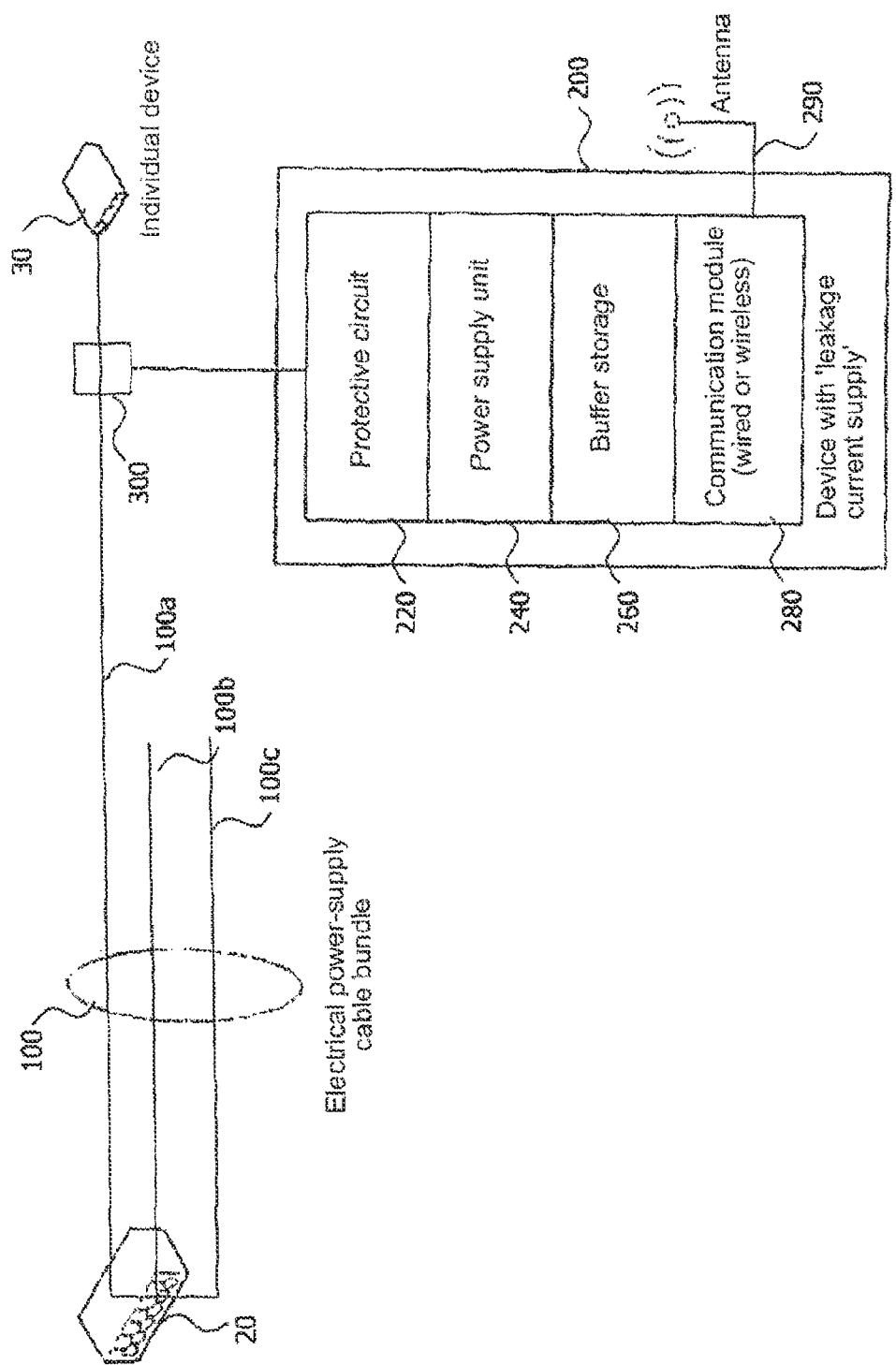
FIG. 3 shows a schematic representation of an architecture for supplying electrical energy to a network according to an embodiment of the present invention.

The functioning of the network node 200 is described with reference to FIG. 3. In FIG. 3, purely by way of example, the network node 200 comprises all of the components shown in FIG. 2, i.e., also the optional protective circuit 220, the optional power supply unit 240 and the optional communication module 280, although the invention is not limited thereto, but, rather, can also be executed if the network node 200 comprises only the buffer storage 260 for storing electrical energy and for supplying electrical energy to the network node 200.

As shown by FIG. 3, three supply lines 100a, 100b, 100c, combined in an electrical power-supply cable bundle 100, lead away from a feed-in point, in order to supply current to devices (loads) on board the aircraft. The supply lines 100a, 100b, 100c are fuse-protected at the feed-in point by a central fuse protection 20, as was shown with reference to FIG. 1. FIG. 3, purely by way of example, shows only three supply lines 100a, 100b, 100c, but any multiplicity of supply lines can be disposed on board the aircraft for the purpose of supplying devices. As can be seen in FIG. 3, the supply line 100a is connected to an individual device 30, in order to supply the individual device 30 with current. In the same way, other individual devices or device groups, as described with reference to FIG. 1, can be connected to the supply lines 100b, 100c. To save space, however, this is not shown in FIG. 3.

A network node 200, described with reference to FIG. 2, is coupled to the supply line 100a via a coupling circuit 300 that serves to couple the network node 200 to the supply line 100a. The coupling to the supply line 100a enables the network node 200 to draw leakage currents (a fraction of the current carried via the supply line 100a) from the supply line 100a. If the drawn leakage current cannot be used for operation of the network node 200, a transformation component, provided in the power supply unit and serving to transform the drawn current, can be used to convert the drawn leakage current into suitable quantities.

For example, by means of the transformation component, the power supply unit 240 can perform a voltage transformation. If, for example, there is a voltage of 110 volts on the supply line 300a, the power supply unit can transform the voltage down to, for example, 3 volts, such that the network node 200 can be operated with the voltage of 3 volts. The drawn leakage current is stored, in the form of electrical energy, in the buffer storage 260 of the network node 200 and, when the network node 200 requires electrical energy, can be delivered to the components that are to be supplied. In particular, the network node 200 draws leakage currents from the supply line 100a at least almost continuously over time via the coupling circuit 300, and thereby charges the buffer storage 260 with electrical energy. Via the communication module 280, the network node can communicate with other network nodes 200 in a wired or wireless manner (in the case of wireless data transmission, via the antenna 290). The energy stored in the buffer storage 260 can be used to supply the communication module 280 with current. Further, the network node 200 can draw electric energy out of the energy buffer storage 260 to enable it to perform specific measurements, such as temperature or pressure measurements, via sensors. The energy required for the measurement to be performed is fed to the corresponding sensor or sensors by the energy buffer storage 260.

The manner of operation of the network node 200 is described in the following with reference to a network node realized as a sensor node, but can also be transferred to all other network nodes 200 that execute a certain function, e.g., a control or measurement function, not continuously over time, but only at certain intervals of time. In the following, the sensor node is also denoted by the reference sign 200 of the network node.

The sensor node 200 is disposed in a sensor network, and comprises at least one sensor for measuring particular ambient parameters. The buffer storage 260 is charged over relatively long periods of time, in particular continuously over time, by drawing leakage currents from supply line 100a. The sensor node 200 is normally in a sleep mode, i.e., it is inactive, and in this state consumes only little current, e.g., in the range of a few µA, e.g., 10 to 20 µA. If a measurement is to be performed, the sensor node 200 wakes up and performs the measurement that is to be executed. In performing the measurement, the sensor node 200 requires a higher current, for example a current in the mA range, e.g., a current of between 10 and 30 mA. This higher current is drawn by the sensor node 200 only for a short period, i.e., only for as long as the measurement that is to be executed is being performed.

The electrical energy for charging the energy buffer storage 260 and for operating the sensor node 200 is drawn by the sensor node 200 from the supply line 100a, via the coupling circuit 300. The coupling circuit 300 couples the sensor node 200 to the supply line in such a way that the sensor node 200 can draw, as leakage current, a fraction of the current carried in the supply line 100a.

In order to protect the sensor node 200 against malfunctions or electrical faults caused by the supply lines 100a, 100b, 100c or other devices, such as the individual device 30, a protective circuit 220 is provided in the sensor node 200. The protective circuit 220 is further configured to protect other devices, such as the individual device 30, against malfunctions or electrical faults caused by the sensor node 200. If, for example, an overvoltage occurs between the lines 100b and 100a, the protective circuit 220 prevents the overvoltage from adversely affecting or damaging the sensor node 200. In the same way, the protective circuit 220 prevents a malfunction or a failure of the individual device 30 from causing faults or damage in the sensor node 200. If, for example, the individual device 30 were to fail, high voltages, in the range of several hundred volts or 1000 volts, can occur, which would destroy the sensor node 200. The protective circuit 220 protects the sensor node 200 against such overvoltages. A Z-diode or an overcurrent circuit-breaker, for example, can be used as a protective circuit. The protective circuit 220 also prevents malfunctions in the sensor node 200, such as voltage peaks occurring as a result of damage to the sensor node 200, from adversely affecting or negatively influencing the individual device 30.

Figure 4C:
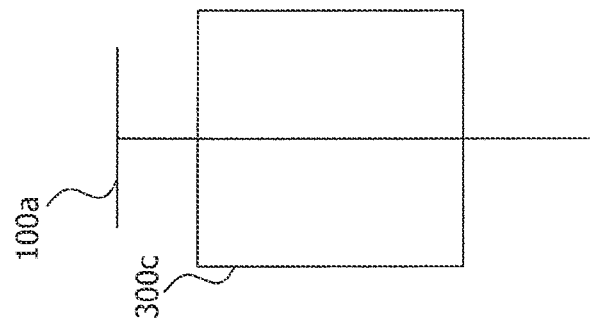
FIG. 4c shows a schematic representation of a third possible realization of the coupling unit from FIG. 3.
Figure 4B:
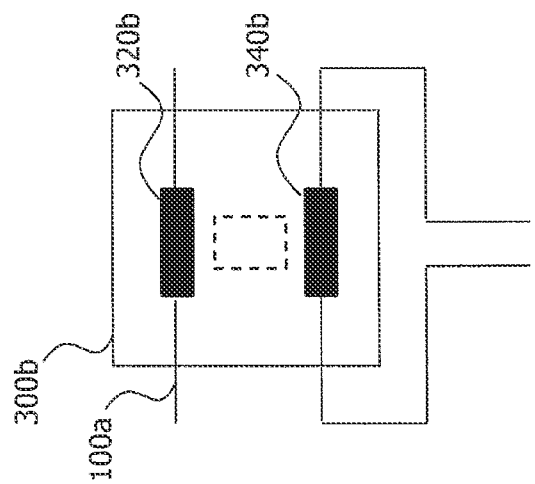
FIG. 4b shows a schematic representation of a second possible realization of the coupling unit from FIG. 3.
Figure 4A:
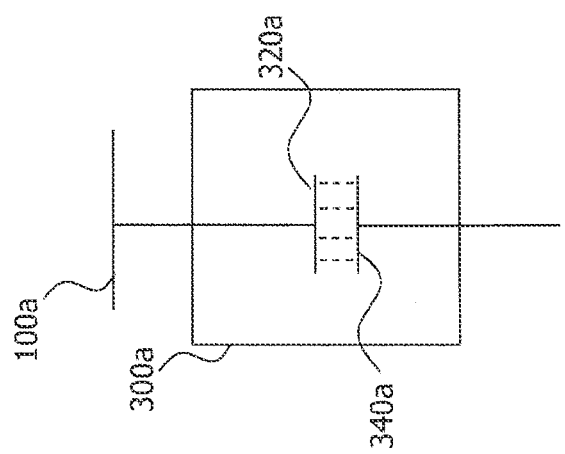
FIG. 4a shows a schematic representation of a first possible realization of a coupling unit from FIG. 3.

FIGS. 4a to 4c show schematic representations of possible configurations of the coupling circuit 300 for coupling the network node 200 to the supply line 100a.

FIGS. 4a to 4b show, by way of example, two possibilities for contactless coupling of the network node 200 to the supply line 100a. FIG. 4c shows a possibility for coupling via contacts.

FIG. 4a shows a schematic representation of a coupling circuit 300a for capacitive coupling. Via the capacitive coupling circuit 300a, the network node 200 can be capacitively coupled to the supply line 100a and, via the capacitive coupling, it can contactlessly draw the leakage current from the supply line 100a, without being connected to the supply line 100a via contacts. A capacitor is disposed in the coupling circuit 300a. According to the realization shown by way of example in FIG. 4a, the capacitor has two capacitor plates 320a, 340a. One of the capacitor plates, namely the capacitor plate 320a in FIG. 4a, is connected to the supply line 100a, the other of the capacitor plates, namely the capacitor plate 340a in FIG. 4a, being connected to the network node 200. As an alternative to the two capacitor plates 320a, 340a, indicated purely schematically in FIG. 4a, each of these capacitor plates 320a, 340a can have, respectively, two or more electrically conductive surfaces that are disposed (in a co-planar manner) next to each other and spatially separated from each other. Accordingly, each of these surfaces, together with the surface opposite it, constitutes a plate capacitor. The two surfaces connected to the network node 200 can then be connected in series to the latter.

As can be seen from FIG. 4a, the capacitor plate 320a is connected to the supply line 100a. According to a first possible realization, the capacitor plate 320a is connected, e.g., directly, to the current-carrying conductor provided in the supply line 100a for conducting the supply current. In accordance with this first realization, a fraction of the current flowing via the current-carrying conductor can be drawn, or "tapped", via the coupling circuit. The drawn current is then stored temporarily, in the form of electrical energy, in the buffer storage 260 of the network node 200. According to a second possible realization, the capacitor plate 320a is connected, e.g., directly, to an insulator (insulation) of the supply line 100a that surrounds, for example, the current-carrying conductor. In accordance with this second realization, a leakage current or creepage current that is present in the insulation and that is smaller by a multiple than the current conducted in the current-carrying conductor can be drawn via the coupling circuit. The drawn current is then stored temporarily, in the form of electrical energy, in the buffer storage 260 of the network node 200.

FIG. 4b shows a schematic representation of a coupling circuit 300b for inductive coupling of the network node 200 to the supply line 100a. Via the inductive coupling circuit 300b, the network node 200 can be inductively coupled to the supply line 100a and, via the inductive coupling, it can contactlessly draw the leakage current from the supply line 100a, without being connected to the supply line 100a via contacts. Disposed in the coupling circuit 300b there are two coils 320b, 340b. One of the coils, namely the coil 320b in FIG. 4b, is connected to the supply line 100a, the other of the two coils, namely the coil 340b in FIG. 4b, being connected to the network node 200.

As can be seen from FIG. 4b, according to a possible realization the coil 320b is disposed in the supply line 100a itself, or is constituted by the latter. The other coil 340b is connected to a line or constituted by the latter. The line ends of this line then lead, as indicated schematically in FIG. 4b, as a "line bundle", e.g., as two lines extending parallel to each other, to the network node 200 (in FIG. 3, this line bundle is shown, in simplified form, as a line leading from the coupling circuit 300 to the network node 200). The coil 320b through which the supply current flows generates a magnetic flux. At least a portion of the magnetic flux induces a voltage in the coil 340b. The current caused as a result of this corresponds to a fraction of the supply current carried in the supply line 100a, and can be stored temporarily, in the form of electrical energy, in the buffer storage 260 of the network node 200.

FIG. 4c shows a schematic representation of a coupling circuit 300c realized by means of contacts. Via the coupling circuit 300c, the network node 200 can be coupled directly to the supply line 100a and, via the direct coupling, can draw the leakage current from the supply circuit 100a.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A network node for a network provided in a transport device, the network node being coupleable to a supply line provided for supplying electrical energy to the transport device in such a way that it can draw a leakage current of the supply line, the network node comprising an energy buffer storage that is chargeable with electrical energy, the energy buffer storage being chargeable by the drawn leakage current with electrical energy,
   wherein the network node is a sensor node,
   wherein the network node comprises a coupling unit to contactlessly transfer electrical energy from the associated supply line to the network node,
   wherein the coupling unit transfers electrical energy one of inductively and capacitively, and
   wherein a current of the electrical energy supplied to the transport device via the supply line has a current intensity that is at least one hundred times higher than the leakage current.

2. The network node according to claim 1, further comprising a protective circuit, the protective circuit being configured to prevent electrical faults caused by the network node from being forwarded in the direction of the supply line.

3. The network node according to claim 2, where the protective circuit is configured to prevent electrical faults from being forwarded to other electronic devices connected to the supply line.

4. The network node according to claim 1, further comprising a protective circuit, the protective circuit being configured to prevent the input of electrical faults, coming from the direction of the supply line.

5. The network node according to claim 4, wherein the protective circuit is configured to prevent the input of electrical faults caused by other electronic devices connected to the supply line, into the network node.

6. The network node according to claim 4, wherein at least one of the energy buffer storage and the protective circuit are integrated into the network node.

7. The network node according to claim 1, wherein the energy buffer storage comprises at least one of an accumulator and a capacitor.

8. The network node according to claim 7, wherein the capacitor comprises a super-capacitor.

9. The network node according to claim 1, wherein the network node is configured to draw leakage current from the supply line continuously over time and to charge the energy buffer storage with the drawn leakage current.

10. The network node according to claim 1, wherein the energy buffer storage is configured to deliver electrical energy, stored in the energy buffer storage for the purpose of supplying the network node, when the network node requires electrical energy.

11. The network node according to claim 1, further comprising a transformation component to transform the drawn leakage current into a quantity suitable for supplying the network node.

12. The network node according to claim 1, further comprising a communication module for at least one of wireless and wired communication with other network nodes provided in the network of the transport device.

13. A network for a transport device, the network comprising:
- a fuse-protected central feed-in point leading separately to one or more supply lines for supplying electrical energy to a respective transport device,
- a multiplicity of network nodes and a corresponding multiplicity of coupling units, at least a subset of the multiplicity of coupling units being configured for contactless, in particular indicative or capacitive, transfer of electrical energy to the network nodes from the associated supply lines,
- wherein each network node is coupled to the supply line provided for supplying electrical energy to the transport device in such a way that it can draw a leakage current of the supply line at a point which is downstream of the central feed-in point, the network node comprising an energy buffer storage that is chargeable with electrical energy, the energy buffer storage being chargeable by the drawn leakage current with electrical energy,
- wherein the network nodes are coupleable to one or more supply lines for supplying electrical energy to the transport device, each of the one or more network nodes being coupleable, respectively, to at least one associated supply line of the one or more supply lines, for the purpose of drawing leakage current, and
- wherein a current of the electrical energy supplied to the transport device via the supply line has a current intensity that is at least one hundred times higher than the leakage current.

14. The network according to claim 13, wherein the network is configured as a sensor network wherein one or more nodes are sensor nodes.

15. The network according to claim 13, further comprising one or more coupling units, each of the one or more network nodes being coupleable to the same associated supply line by means of one of the one or more coupling units.

16. The network according to claim 13, at least a subset of the network nodes comprising a communication module for at least one of wireless and wired communication with other network nodes provided in the network.

17. A network node for a network, the network node being coupled to a plurality of supply lines provided for supplying electrical energy to a plurality of respective transport devices in such a way that the network node can draw leakage currents from each of the plurality of supply lines, the network node comprising an energy buffer storage that is chargeable with electrical energy, the energy buffer storage being chargeable by the drawn leakage currents with electrical energy,
- wherein the network node comprises a coupling unit to contactlessly transfer electrical energy from the plurality of supply lines to the network node,
- wherein the coupling unit transfers electrical energy one of inductively and capacitively, and
- wherein a current of the electrical energy supplied to the plurality of transport devices via the plurality of supply lines has a current intensity that is at least one hundred times higher than the leakage current.

18. The network node according to claim 1, wherein the current intensity of the current is one thousand times to ten thousand times higher than the leakage current.

* * * * *